United States Patent
Yamagishi

(10) Patent No.: US 7,344,443 B2
(45) Date of Patent: Mar. 18, 2008

(54) GAME SYSTEM USING TOKENS

(75) Inventor: Junichi Yamagishi, 6-3, 2-chome, Kaminarimon, Taito-ku, Tokyo, 111-0034 (JP)

(73) Assignees: Unirec Co., Ltd., Tokyo (JP); Junichi Yamagishi, Tokyo (JP)

( * ) Notice: Subject to any disclaimer, the term of this patent is extended or adjusted under 35 U.S.C. 154(b) by 0 days.

(21) Appl. No.: 10/279,552

(22) Filed: Oct. 24, 2002

(65) Prior Publication Data
US 2004/0082379 A1   Apr. 29, 2004

(51) Int. Cl.
*A63F 13/12*   (2006.01)

(52) U.S. Cl. .............................. 463/25; 463/40; 463/41; 463/42

(58) Field of Classification Search ................. 463/25, 463/40–43, 16, 20–22, 29, 39; 902/23; 379/91.01; 340/5.4, 5.41, 5.42
See application file for complete search history.

(56) References Cited

U.S. PATENT DOCUMENTS

| | | | |
|---|---|---|---|
| 5,458,333 A * | 10/1995 | Takemoto et al. ............ 463/25 |
| 5,718,429 A * | 2/1998 | Keller, Jr., ................... 273/274 |
| 5,762,552 A * | 6/1998 | Vuong et al. ................. 463/25 |
| 5,765,552 A * | 6/1998 | Zanen et al. ........... 128/203.15 |
| 5,770,533 A | 6/1998 | Franchi |
| 5,797,085 A | 8/1998 | Beuk et al. |
| 5,839,956 A * | 11/1998 | Takemoto .................... 463/25 |
| 5,902,983 A * | 5/1999 | Crevelt et al. .............. 235/380 |
| 5,999,808 A | 12/1999 | LaDue |
| 6,019,283 A * | 2/2000 | Lucero ....................... 235/380 |
| 6,315,668 B1 | 11/2001 | Metke et al. |
| 6,409,602 B1 | 6/2002 | Wiltshire et al. |
| 6,577,733 B1 * | 6/2003 | Charrin ...................... 380/251 |
| 6,628,934 B2 * | 9/2003 | Rosenberg et al. ......... 455/411 |
| 6,631,840 B1 * | 10/2003 | Muramatsu et al. ........ 235/379 |
| 6,645,075 B1 | 11/2003 | Gatto et al. |
| 6,699,124 B2 | 3/2004 | Suchocki |

(Continued)

FOREIGN PATENT DOCUMENTS

JP   10-108977   4/1998

(Continued)

*Primary Examiner*—Robert E. Pezzuto
*Assistant Examiner*—Matthew D. Hoel
(74) *Attorney, Agent, or Firm*—Jordan and Hamburg LLP

(57) ABSTRACT

A game system using tokens allows a user to play a game on a mobile communication terminal at a location remote from a game hall. The game system includes a game hall (1) to lend tokens to a player so that the player may play game machines (3) installed in the game hall with the tokens, keep tokens deposited by the player after the play, and return the kept tokens to the player so that the player may play the game machines with the tokens, a management unit (7) provided for the game hall, connectable to the Internet and having a database (9) to store and update data on the kept tokens, a mobile communication terminal (13) connectable to the Internet to receive game content and allow the player to play a game on the mobile communication terminal, and a game content provider (11) to provide the game content to the Internet. Gains and losses of tokens of the player on playing the game on the mobile communication terminal are transmitted to the management unit, which updates the data on the kept tokens in the database accordingly.

5 Claims, 1 Drawing Sheet

U.S. PATENT DOCUMENTS

| | | | |
|---|---|---|---|
| 6,729,956 B2 * | 5/2004 | Wolf et al. | 463/25 |
| 6,739,972 B2 * | 5/2004 | Flanagan-Parks et al. | 463/25 |
| 6,846,238 B2 | 1/2005 | Wells | |
| 6,921,333 B2 | 7/2005 | Taguchi | |
| 6,928,278 B2 * | 8/2005 | Shimomura | 455/411 |
| 7,025,674 B2 * | 4/2006 | Adams et al. | 463/1 |
| 7,036,012 B2 * | 4/2006 | Charrin | 713/169 |
| 2002/0032601 A1 * | 3/2002 | Admasu et al. | 705/13 |
| 2002/0034299 A1 * | 3/2002 | Charrin | 380/251 |
| 2002/0123336 A1 * | 9/2002 | Kamada | 455/420 |
| 2003/0114217 A1 * | 6/2003 | Walker et al. | 463/20 |
| 2003/0176218 A1 * | 9/2003 | LeMay et al. | 463/25 |
| 2003/0204472 A1 | 10/2003 | Yamagishi | |
| 2003/0208438 A1 * | 11/2003 | Rothman | 705/38 |
| 2004/0032086 A1 * | 2/2004 | Barragan | 273/292 |
| 2004/0067794 A1 * | 4/2004 | Coetzee | 463/42 |
| 2004/0082379 A1 | 4/2004 | Yamagishi et al. | |
| 2004/0185935 A1 | 9/2004 | Yamagishi | |
| 2006/0247041 A1 * | 11/2006 | Walker et al. | 463/29 |
| 2006/0252509 A1 * | 11/2006 | Walker et al. | 463/25 |
| 2006/0252510 A1 * | 11/2006 | Walker et al. | 463/25 |
| 2006/0287047 A1 * | 12/2006 | Walker et al. | 463/16 |
| 2006/0287074 A1 * | 12/2006 | Walker et al. | 463/25 |
| 2006/0287075 A1 * | 12/2006 | Walker et al. | 463/25 |

FOREIGN PATENT DOCUMENTS

| | | |
|---|---|---|
| JP | 11-164953 | 6/1999 |
| JP | 11-254954 | 9/1999 |
| JP | 2000-321805 | 11/2000 |
| JP | 2001-70630 | 3/2001 |
| JP | 2001-232054 | 8/2001 |
| JP | 2001-246146 | 9/2001 |
| JP | 2001-276403 | 10/2001 |
| JP | 2001-319164 | 11/2001 |
| JP | 2002-35415 | 2/2002 |
| JP | 2002-109395 | 4/2002 |
| WO | WO 96/09592 A1 * | 3/1996 |

* cited by examiner

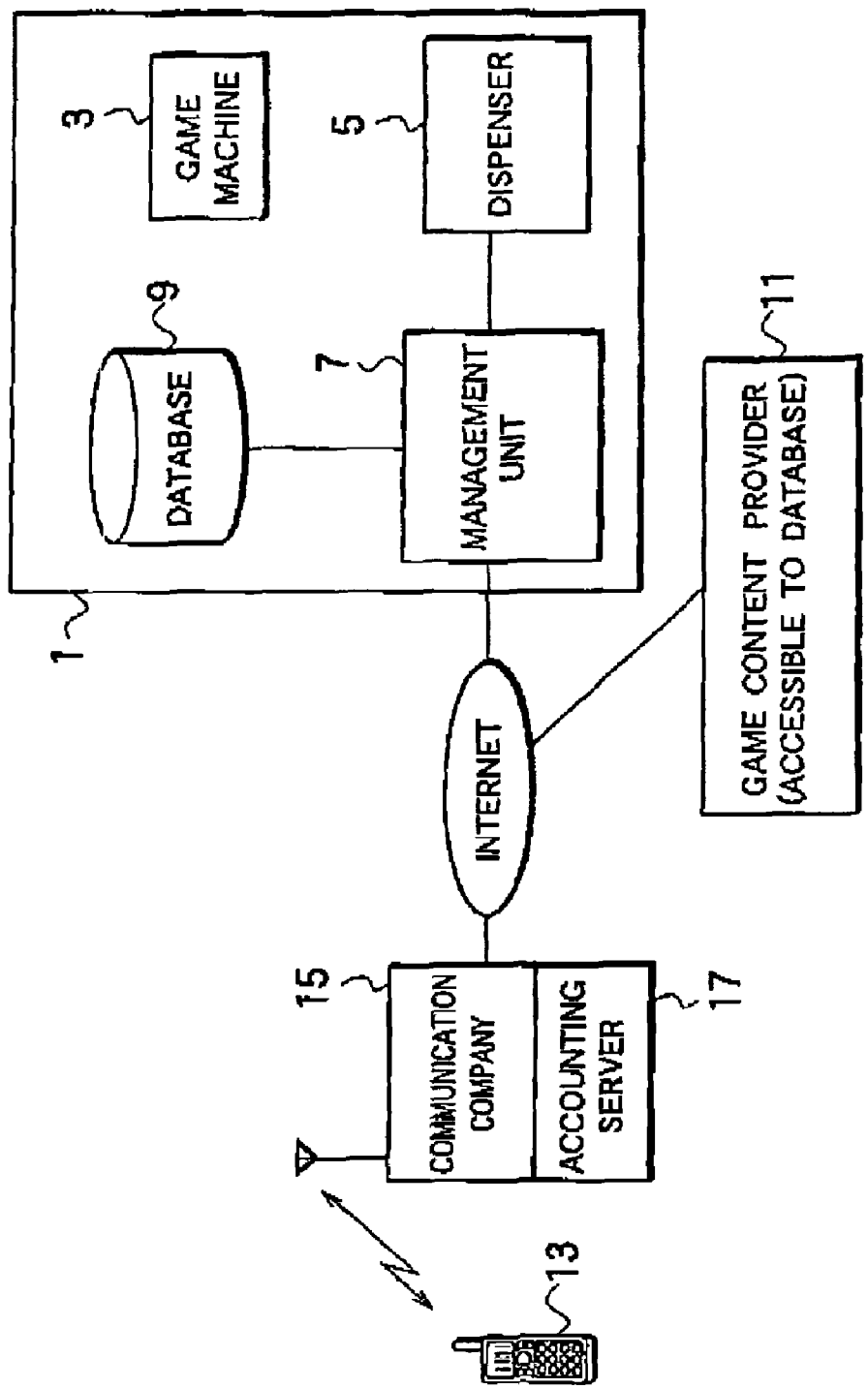

GAME SYSTEM USING TOKENS

BACKGROUND OF THE INVENTION

1. Field of the Invention

The present invention relates to a game system that lends tokens or medals to a player and lets the player play game machines with the tokens.

2. Description of the Related Art

An example of a game machine using tokens or medals is disclosed in Japanese Patent Laid Open Publication No. 10-108977. The game machine is installed in a game hall where a player borrows tokens at a predetermined unit price and plays the game machine with the tokens. The borrowed tokens are prohibited from bringing out of the game hall, and therefore, the player deposits tokens left after the play to the game hall. When visiting the game hall next time, the player receives the deposited tokens and plays the game machine with the tokens.

In these days, one can enjoy games on a mobile communication terminal such as a cellular phone by downloading game content without visiting game halls.

The cellular phone is unable to let the user borrow tokens or play token-based games. To play the token-based games, one must go to a game hall.

SUMMARY OF THE INVENTION

An object of the present invention is to provide a game system using tokens or medals, capable of allowing a player to play games with tokens in a game hall as well as playing token-based games on a mobile communication terminal.

A first aspect of the present invention provides a game system using tokens or medals. The game system includes a game hall to lend tokens to a player so that the player may play game machines installed in the game hall with the tokens, keep tokens deposited by the player after the play, and return the kept tokens to the player so that the player may play the game machines with the tokens, a management unit provided for the game hall, connectable to the Internet and having a database to store and update data on the kept tokens, a mobile communication terminal connectable to the Internet to receive game content and allow the player to play a game on the mobile communication terminal, and a game content provider to provide the game content to the Internet. Gains and losses of tokens of the player on playing the game on the mobile communication terminal are transmitted to the management unit, which updates the data on the kept tokens in the database accordingly.

A second aspect of the present invention enables the game content provider of the first aspect to retrieve the data on the kept tokens of the player from the database and continue to provide the game content to the player as long as losses of tokens of the player are within the kept tokens.

A third aspect of the present invention provides the system of the first aspect with an accounting server to allow tokens to be lent to the player on the mobile communication terminal and charge the player for the lent tokens.

According to the first aspect, the game hall lends tokens to a player so that the player may play game machines installed in the game hall with the tokens, keeps tokens deposited by the player after the play, and returns the kept tokens to the player so that the player may play the game machines with the tokens. The management unit of the game hall is connectable to the Internet and has the database to store and update data on the kept tokens. The data on the kept tokens in the database is accessible from other devices.

The player may employ a mobile communication terminal to receive game content from the game content provider through the Internet and play a game. Gains and losses of tokens of the player on playing the game on the mobile communication terminal are transmitted to the management unit, which updates the data on the kept tokens in the database accordingly. The player is capable of not only playing the game machines in the game hall by using tokens but also enjoying token-based games on the mobile communication terminal.

Gains and losses of tokens of the player on playing games on the mobile communication terminal are used to update the data on the kept tokens of the player in the database. When visiting the game hall next time, the player may receive the updated number of tokens.

In addition to the effects of the first aspect, the second aspect allows the game content provider to retrieve the data on the kept tokens of the player from the database and continuously provide the game content to the player as long as losses of tokens of the player are within the kept tokens. As a result, the player may properly play games on the mobile communication unit without limitlessly losing tokens.

In addition to the effects of the first aspect, the third aspect employs the accounting server to allow tokens to be lent to the player on the mobile communication terminal and charge the player for the lent tokens. Even if the player has no tokens in the database, the player may borrow tokens through the mobile communication terminal and enjoy games thereon.

BRIEF DESCRIPTION OF THE DRAWINGS

FIG. 1 is a block diagram showing a game system using tokens according to an embodiment of the present invention.

DETAILED DESCRIPTION OF EMBODIMENTS

FIG. 1 is a block diagram showing a game system using tokens or medals according to an embodiment of the present invention. The system involves a game hall 1 having a game machine 3 played with tokens. Although there is only one game machine in the game hall 1 of FIG. 1, an optional number of game machines may be installed in the game hall 1 according to another embodiment of the present invention. Although there is only one game hall in FIG. 1, an optional number of game halls may be spread nationwide according to still another embodiment of the present invention.

The game hall 1 has a dispenser 5 connectable to the Internet, which dispenses tokens in return for money inserted into the dispenser 5 by a player. After playing the game machine 3 with the tokens, the player may still have tokens. In this case, the player may deposit the remaining tokens into the dispenser 5. Whenever the player receives the deposited tokens from the dispenser 5 or whenever the player deposits tokens into the dispenser 5, the player is identified by, for example, a fingerprint or a password.

The tokens deposited into the dispenser 5 are returned to the player when the player visits the game hall 1 next time, to allow the player to play the game machine 3 with the tokens.

The dispenser 5 is connected to a management unit 7, which is controlled by a responsible person of the game hall 1. The management unit 7 includes an MPU, a memory, a database 9, and the like. The database 9 is controlled by the management unit 7, to store data read from the dispenser 5 and update the data.

The system also involves a game content provider 11 that provides game content to the Internet. The game content includes games related to the database 9. The games related to the database 9 include games in which the player may gain or lose tokens or scores convertible into tokens.

The responsible person of the management unit 7 may be the same as or different from a responsible person of the game content provider 11.

The system also involves a mobile communication terminal 13 such as a cellular phone connectable to the Internet through a communication company 15, to receive game content from the game content provider 11 and allow a user of the terminal 13 to play a game. To receive game content, the user of the terminal 13 must make a contract with the game content provider 11 beforehand. The contract may be made in writing or through the terminal 13. The communication company 15 has an accounting server 17.

An operation of the system of the present invention will be explained. In the game hall 1, a player inserts money into the dispenser 5 and receives tokens or medals corresponding to the inserted money. The player plays the game machine 3 with the tokens. If successful, the player may win tokens more than the tokens spent for the game machine 3.

The tokens in the player's hand are prohibited from taking out of the game hall 1, and therefore, the player deposits the remaining tokens into the dispenser 5. When visiting the game hall 1 next time, the player may receive the whole or part of the deposited tokens to again play the game machine 3 with the tokens. Data on the tokens deposited into the dispenser 5 is stored in the database 9 through the management unit 7. The data in the database 9 is updated as and when needed.

The player may use the mobile communication terminal 13 to enjoy a token-based game at a location remote from the game hall 1 with the use of the deposited tokens. In the game hall 1, the dispenser 5 authenticates the player and returns the deposited tokens to the player. On the terminal 13, the player inputs a password or fingerprint for authentication, and once authenticated, the player can use the deposited tokens.

The player connects the mobile communication terminal 13 to the Internet, receives game content related to the database 9 from the game content provider 11, and plays a game on the terminal 13. Gains or losses of the player in the game are transmitted to the management unit 7, which updates the token data of the player in the database 9 accordingly.

Whenever the player plays a game on the mobile communication terminal 13, the data of the player in the database 9 is updated. When visiting the game hall 1 next time to play the game machine 3, the player can receive tokens from the dispenser 5 according to the updated data of the player in the database 9.

If no token is left in the database 9 due to games played by the player on the mobile communication terminal 13, the dispenser 5 in the game hall 1 returns no token to the player. If the player deposits only a small number of tokens into the dispenser 5 in the game hall 1 and if the player gets many tokens in games on the terminal 13, the data of the player in the database 9 will be updated to include the won tokens. When visiting the game hall 1 next time, the player can receive many tokens from the dispenser 5 in the game hall 1 according to the updated data in the database 9.

When the player plays a game on the mobile communication terminal 13, the game content provider 11 accesses the database 9, retrieves the data of the player, and continues to provide game content to the player as long as losses of the player in the game are within the remaining tokens of the player recorded in the database 9. If the losses of the player are equal to the remaining tokens in the database 9, i.e., if the remaining tokens become zero, the provider 11 stops to provide the game content to the player. Even if the losses of the player exceed the tokens in the database 9, the provider 11 may continue to provide the game content to the player after recording the losses of the player.

If the number of tokens of the player in the database 9 becomes zero, the player may borrow tokens through the mobile communication terminal 13. In this case, the accounting server 17 charges the player for the borrowed tokens. Namely, the player can borrow tokens without visiting the game hall 1 to manipulate the dispenser 5 and can play games on the terminal 13. Even if the player loses all tokens which the player has deposited into the dispenser 5 in the game hall 1 beforehand, the player can newly borrow tokens through the terminal 13.

If the number of tokens of the player recorded in the database 9 becomes zero, the game content provider 11 can stop providing game content to the player. Instead, the provider 11 can continuously provide the game content to the mobile communication terminal 13 of the player on an assumption that the continuation of game play by the player on the terminal 13 is an intention of the player to borrow tokens. In this case, tokens are automatically lent to the player and the accounting server 17 charges the player for the lent tokens.

The charges for the lent tokens may be collected by the communication company 15 for an owner of the game system. The communication company 15 deducts communication fees and commissions from the collected charges and pays the remainder to the owner of the game system.

When the game content provider 11 provides game content to the player, the accounting server 17 charges the player for the game content. Such charges may be collected by the communication company 15 for the provider 11. The communication company 15 deducts communication fees and commissions from the collected charges and pays the remainder to the provider 11.

In this way, the system of the present invention enables a player to enjoy gambling games on a mobile communication terminal.

Although the embodiment has been explained with reference to the game machine using tokens or medals, the present invention is also applicable to other game machines including those using materials such as pachinko balls or pinball balls.

What is claimed is:

1. A game system using tokens, comprising:
    a game ball, lending tokens to a player so that the player may play at least one game machine installed in the game ball with the lent tokens;
    said game ball accepting from the player and keeping tokens deposited by the player including remaining ones of the lent tokens and tokens won by the player, and said game ball returning the kept tokens to the player upon request only for enabling the player to play the game machines with the tokens wherein said tokens of the system are enabling only for playing said at least one game machine;
    a management unit provided for the game ball and connecting to the Internet, said management unit including a database for storing and updating combined data, the combined data including data representing tokens available for play, said tokens available for play including the kept tokens including won tokens, and the combined data also including the lent tokens and spent tokens;
    a portable communication terminal which is hand portable and embodied as a cellular phone connecting to the Internet for receiving game content, said portable communication terminal being configured so as to function concurrently as a portable game terminal and a settlement medium device for making a settlement for said lent tokens, said game content being playable by the player on the portable communication terminal, said cellular phone being operable by the player via an agreement between the player and a communications company;

a game content provider for accessing the database to read the combined data and for providing the game content configured for the cellular phone together with the combined data to the portable communication terminal via the Internet;

cellular phone transmitting to said management unit gains and losses of the player from playing the game on the portable communication terminal, said management unit updating combined data on the tokens of the player in the database;

a communications company relaying means for relaying the game content between the game content provider and the cellular phone transmit the game content from the game content provider to the cellular phone;

the management unit automatically lending tokens to the player in response to a communication of the settlement medium device when the tokens available for play stored in the database reaches zero and the player continues to play a game on the portable communication terminal, whereby the player continues to play the game without concomitantly providing more tokens, concomitantly authorizing a purchase of tokens or concomitantly expressly requesting to borrow tokens;

an accounting server provided with the communications company for accounting for the automatically lent tokens as soon as said tokens have been spent by the player while relaying between the game content provider and the portable communication terminal through the communications company relaying means, and for assembling and providing accounting information for the communications company to charge cellular phone charges together with charges for the automatically lent tokens; and the communications company charging the player for the cellular phone charges together with the charges for the automatically lent tokens accounted for by the accounting server based on initiation by the cellular phone functioning the settlement medium device.

2. The system of claim 1, wherein the game content provider retrieves the data on the kept tokens of the player from the database and continues to provide the game content to the player without automatic lending as long as losses of tokens of the player are within the kept tokens.

3. The game system of claim 1, wherein said game ball keeps tokens won by the player after playing said game machine without returning money and returns the kept tokens to the player only for playing the game machine with the tokens.

4. A game system for managing tokens, used in playing games in at least one game ball, based on agreement between the game ball and a communications company, the game system comprising:

a token dispensing unit dispensing tokens to a player so that the player may play at least one game machine installed in the game ball with the dispense tokens wherein said tokens are of use limited to enabling operation of devices of the game ball including said at least one game machine;

said token dispensing unit accepting from the player and keeping tokens deposited by the player including remaining ones of the dispensed tokens and tokens won by the player, and said token dispensing unit returning the kept tokens to the player upon request for enabling said at least one game for the player to play;

a management unit provided for the game ball and connecting to the Internet, said management unit including a database for storing and updating combined data, the combined data including data representing tokens available for play, said tokens available for play including the kept tokens including said tokens won, and the combined data also including the dispensed tokens and spent tokens;

a cellular phone connecting to the Internet for receiving game content, said cellular phone being configured so as to function concurrently as a portable game terminal operating using said game content and a settlement medium device for making a settlement for value of tokens allotted to the player, said cellular phone being operable by the player via an agreement between the player and the communications company;

a game content provider for accessing the database to read the combined data and for providing the game content configured for the cellular phone together with the combined data to the portable communication terminal via the Internet;

the cellular phone transmitting to said management unit gains and losses of the player from playing a game on the cellular phone based on said game content, said management unit updating combined data on the tokens of the player in the database;

a communications company relaying means for relaying the game content between the game content provider and the cellular phone to transmit the game content from the game content provider to the cellular phone;

the management unit automatically lending tokens to the player as tokens available for play in response to a communication of the settlement medium device when the tokens available for play stored in the database reaches zero and the player continues to play the game on the cellular phone, whereby the player continues to play the game without concomitantly providing more tokens, concomitantly authorizing a purchase of tokens or concomitantly expressly requesting to borrow tokens;

an accounting server provided with the communications company for accounting for the automatically lent tokens as soon as said tokens have been spent by the player while relaying between the game content provider and the portable communication terminal through the communications company relaying means, and for assembling and providing accounting information for the communications company to charge cellular phone charges together with charges for the automatically lent tokens; and the communications company charging the player for the cellular phone charges together with the charges for the automatically lent tokens accounted for by the accounting server based on initiation by the cellular phone functioning the settlement medium device.

5. The system of claim 4, wherein the game content provider retrieves the data on the kept tokens of the player from the database and continues to provide the game content to the player without automatic lending as long as losses of tokens of the player are within the kept tokens.

* * * * *